United States Patent
Beer

(10) Patent No.: US 7,077,285 B2
(45) Date of Patent: Jul. 18, 2006

(54) OIL CONTAINER AND A PROCESS FOR THE PRODUCTION THEREOF

(75) Inventor: Markus Beer, Morsbach (DE)

(73) Assignee: IBS Filtran, Morsbach (DE)

( * ) Notice: Subject to any disclaimer, the term of this patent is extended or adjusted under 35 U.S.C. 154(b) by 273 days.

(21) Appl. No.: 10/312,803

(22) PCT Filed: Dec. 9, 2000

(86) PCT No.: PCT/EP00/01246

§ 371 (c)(1),
(2), (4) Date: Aug. 13, 2003

(87) PCT Pub. No.: WO02/10636

PCT Pub. Date: Feb. 7, 2002

(65) Prior Publication Data

US 2004/0020931 A1 Feb. 5, 2004

(30) Foreign Application Priority Data

Aug. 1, 2000 (DE) ................................ 100378560

(51) Int. Cl.
*B65D 85/00* (2006.01)

(52) U.S. Cl. ..................................................... 220/524

(58) Field of Classification Search ............... 220/4.12, 220/4.13, 661, 562, 612, 613, 567.2, 86.2, 220/DIG. 32; 128/198 E; 222/57

See application file for complete search history.

(56) References Cited

U.S. PATENT DOCUMENTS

| | | | | | |
|---|---|---|---|---|---|
| 2,201,314 | A | * | 5/1940 | Illsley | 123/41.15 |
| 4,036,390 | A | * | 7/1977 | Morse | 220/562 |
| 4,301,841 | A | * | 11/1981 | Sandow | 141/98 |
| 4,579,242 | A | * | 4/1986 | Ellis, III | 220/4.13 |
| 4,632,268 | A | * | 12/1986 | Melzi et al. | 220/573 |
| 5,052,571 | A | * | 10/1991 | Susa et al. | 220/203.24 |
| 5,547,096 | A | * | 8/1996 | Kleyn | 220/4.14 |
| 5,911,337 | A | * | 6/1999 | Bedeker | 220/562 |
| 6,349,842 | B1 | * | 2/2002 | Reutter | 220/201 |
| 6,444,946 | B1 | * | 9/2002 | Korte | 219/121.6 |
| 6,793,095 | B1 | * | 9/2004 | Dulisse et al. | 220/612 |
| 6,823,968 | B1 | * | 11/2004 | Baeumler | 184/106 |
| 2002/0165489 | A1 | * | 11/2002 | McGuckin et al. | 604/109 |

* cited by examiner

*Primary Examiner*—Nathan J. Newhouse
*Assistant Examiner*—Eugene Lhymn
(74) *Attorney, Agent, or Firm*—Baker & Hostetler LLP

(57) ABSTRACT

What is proposed is an oil container which is suitable for use in optimizing the oil balance of an internal combustion engine or a transmission, particularly an automatic transmission, and which has low weight and can be produced in such a way that adverse effects with respect to the reliability of the overall system are virtually excluded, and a process for producing same. To this end, the oil container is to be designed in such a way that the volume flow capable of entering the oil container through said at least one inlet opening (8) is invariably greater than the volume flow capable of discharging through said at least one outlet opening (12), said oil container being constituted of multiple components using at least two plastic housing components (1, 2, 3), at least two of said plastic housing components being joined to each other by laser welding.

24 Claims, 2 Drawing Sheets

OIL CONTAINER AND A PROCESS FOR THE PRODUCTION THEREOF

The invention relates to an oil container for engines and transmissions, particularly automatic transmissions for motor vehicles.

It is general practice in motor vehicles to feed the oil circulation required for lubricating and cooling the engine from an oil sump situated in an oil pan beneath the engine, where the oil is sucked out of the oil pan and fed with pressure into an oil channel system of the engine by means of an oil pump. The oil drips and flows from the lubricating and spraying sites back into the oil pan. The surface of the oil pan serves to cool the oil; if increased cooling is required, a separate oil cooler is coupled into the circulation, preferably at the pressure side thereof.

The oil volume is determined by the circulating volume of the oil circulation and by the oil residence time in the oil pan required for sufficient cooling.

On the other hand, it is desirable to maintain the oil volume as low as possible, so that the oil after cold starting would reach its operating temperature as quickly as possible and assume its functions as intended by design. To cut down the consumption, it is also desirable to maintain the weight of an operational engine, also including the oil filling, as low as possible. In addition, aerodynamic requirements necessitate an engine construction as small as possible, particularly avoiding large oil pans.

With large oil volumes, in particular, additional constructional volume must be provided near the oil pan, because the volume of the oil supply is substantially increased as a result of thermal expansion when the oil is heated up. Even at the maximum operating temperature, the oil level in the oil pan must not be allowed to rise such that the counterweights of the crankshaft submerge in the oil supply. Such submerging would give rise to oil foaming and, if such oil foam is taken in by the oil pump it may lead to an oil pressure breakdown and subsequently to major engine damage.

To avoid these problems, a so-called dry sump lubrication has been provided in the past, particularly with high performance engines, wherein merely a very small oil pan is provided beneath the engine, from which the oil having dripped back is conveyed by a conveying pump into a separate oil reservoir outside the engine. Necessary cooling of the oil and providing a sufficiently large amount of oil, as well as appropriate space of expansion when the oil is heated can be accomplished in such a separate oil reservoir in a technically simple fashion. At the same time, such an oil reservoir can be combined with an oil cooler. By means of a pressure pump, the oil is fed from the oil reservoir into the oil circulation of the engine. This solution allows minimizing the constructional volume of the engine and a nearly optimum oil circulation design. However, this solution involves the drawbacks of additional constructional input for a separate oil reservoir, the corresponding lines and the additional oil conveying pump. Furthermore, the oil pressure pump has to be mounted separately and cannot be integrated in the crank drive, as is the case in vehicles having wet sump lubrication. As a result, there are substantial additional costs, so that dry sump lubrication in large-scale produced vehicles is no longer possible today.

In analogy, the above-mentioned problems with internal combustion engines also arise in downstream transmissions. In this event, however, there are further requirements as to limiting the oil volume, because heating of the oil to operation temperature proceeds more slowly as a result of an absent internal source of heat, as by combustion in an engine, and, in addition, there are even more severe restrictions with respect to the available space for installation.

In particular, this is true in automatic transmissions wherein a larger supply of oil is required due to the system. The reason for this is that the oil supply in an automatic transmission not only is required to lubricate the bearings and gear pairs but rather, the oil also serves in the hydrodynamic transfer of engine power to the transmission via a hydrodynamic torque converter and, in addition, is used as hydraulic fluid to control the transmission. In particular, the use as hydraulic fluid to produce frictional transfer of the multiple disc and strap brakes should be mentioned, by means of which the gears are shifted in an automatic transmission. In a fully automatic transmission, particularly for use in automobiles or all-terrain utility vehicles, shifting normally is effected under load, i.e., with no interruption in power flux, and therefore, the transmission oil also has to absorb and dissipate lost heat generated by slippage of the multiple disc and strap brakes as a result of the speed difference during shifting. For this reason, special oils, so-called automatic transmission fluids (ATF) are used in such automatic transmissions.

However, the properties of such ATFs also include a comparatively high thermal expansion and an extreme tendency of foam formation. In context with the above-described conditions of operation, there is not only the necessity of having a particularly broad range of operation temperatures for the ATF, but, in association with the relatively high thermal expansion, the necessity of additional space for installation. The oil pan must be of such a design that under no conditions of operation the ATF level will rise so high that the transmission gears submerge in the oil supply. Within an exceedingly short time, the rotating gears would give rise to massive foaming of the ATF, so that the function of the transmission would no longer be ensured and severe damage to the transmission would have to be expected.

However, large volumes of oil in oil pans involve the disadvantage that malfunctions may arise because the oil supply in the oil pan moves from one side to the other as a result of vehicle motion, so that the suction nozzle of the oil pump possibly emerges from the oil supply, resulting in a breakdown of the oil pressure with corresponding damage. One countermeasure known from the field of use of internal combustion engines on board of boats and ships is to design the oil pan in a way so as to form partition walls dividing the oil pan space into multiple sections, said sections being in flow communication with each other. The partition walls prevent massive oil displacement by wave formation or periodic movements of the drive, which would make the oil pump lying bare. However, such a solution involves the disadvantage of immense efforts when producing the oil pans, preventing a competitive price level in a mass market such as automobiles. Furthermore, such partitions in transmission oil pans of a generally quite flat design do not result in substantial improvements.

A laser welding process for automatic transmission oil filters is known from EP 0,995,535 A2 and DE 198 60 357 A1, wherein two plastic filter half-shells for automatic transmission oil filters are placed one on top of the other and welded along their common edge using laser light, one filter half-shell consisting of laser light-permeable plastic and the other filter half-shell of laser light-impermeable plastic. The laser beam is passed through the laser light-permeable filter half-shell along the position of contact with the other filter half-shell. As a result of light absorption of the laser light-impermeable plastic material, the two filter half-shells are fused together in the welding zone. To this end, the use of a neodymium YAG pulsed laser has been proposed.

It has also been described that the filter half-shells should be made of the same plastic material.

DE 195 10 493 A1 describes DE-OS 36 21 030 to report that plastic films are welded together by exposure to laser radiation. To this end, the plastic films are placed one on top of the other in a planar fashion. Subsequently, a focussed laser beam is directed onto the films, thereby heating the films in the irradiated area so as to reach a melted state and undergo co-fusing.

EP 0,159,169 A2 is said to report a method of welding plates made of plastic by means of laser radiation. The laser beam is said to penetrate a first plate which is said to consist of a plastic material with no additives, so that the plate is largely transparent for the laser beam. This plate is situated on a second plate provided with an additive so that the laser beam Is absorbed in the plastic material. The laser beam is directed through the first plate and onto the second plate, so that the adjoining contact areas of the two plates are melted to form a joint during subsequent cooling.

In this respect, it is described as disadvantageous in DE 195 10 493 A1 that the first plate may not include any additive and is present in a non-colored opaque-white state, while the second plate can be colored with a black dye. The resulting unevenness of a component produced in this way is described as disadvantageous to an extent that such a process would not be considered a possibility.

Also, DE 195 10 493 A1 suggests a process for producing switch housings, wherein coloration of both plastic components is said to be effected in such a way that a first workpiece component has a transmission in a range of only is about 60% so as to maintain the color appearance of a switch housing component as uniform as possible.

It is described as well-known in DE 198 60 357 A1 to produce filters to be installed in automatic transmissions by joining housing half-shells using friction welding processes, e.g. various vibratory friction welding processes or welding by means of ultrasound. It is known to be disadvantageous that these friction welding processes give rise to abrasion as a result of the relative motion between the counterparts to be joined, which abrasion adheres to the final workpiece in the form of a contamination. The corresponding firms and automobile manufacturers therefore have elaborated numerous procedures and protocols according to which components produced in this manner have to be cleansed so as to limit the residual contamination to a statistically tolerable extent.

The invention therefore is based on the object of providing an oil container of the type mentioned above, which container is suitable for use in optimizing the oil balance of an internal combustion engine or a transmission, particularly an automatic transmission, and which has low weight and can be produced in a way so as to virtually exclude adverse effects with respect to the reliability of the overall system.

According to the invention, said object is accomplished by means of an oil container of the type mentioned above for automatic receiving and discharging of a volume of oil, which container has a storage chamber to receive a volume of oil, at least one inlet opening and at least one outlet opening, said at least one inlet opening and said at least one outlet opening being designed such that the volume flow capable of entering the oil container through said at least one inlet opening is invariably greater than the volume flow capable of discharging through said at least one outlet opening, said oil container being constituted of multiple components using at least two plastic housing components, at least two of said plastic housing components being joined to each other by laser welding.

Using an oil container according to the invention, it is possible, despite the problems illustrated above, to achieve a small construction volume—particularly with automatic transmissions—and, in particular, a small oil pan, with material and production costs being so low that the cost of an oil container according to the invention is nearly compensated by the savings resulting from the smaller transmission housing and the smaller oil pan.

This can be achieved by a design using plastic housing components which can be produced e.g. in an injection molding process at extremely low cost and even with complex geometry, so that the oil container of the invention can be accommodated at any position in the transmission housing where some space for installation is available, e.g. beside transmission shafts.

As a result of the inventive design of inlet opening and outlet opening, it is possible e.g. for the ATF to proceed into the oil container of the invention when a specific oil temperature is exceeded, or by dripping down from lubricating points, said design ensuring that the container is always maintained in filled condition, thereby relieving the oil pan by the container volume. The outlet opening ensures slow emptying of the container, e.g., when the transmission is idle, so that the entire oil volume is available to the oil pumps when operation is resumed.

As a result of the multi-component partitioning, it is possible to achieve highly complex geometries, enabling arrangement of the oil container even in angled corners of the housing. Owing to the laser welding according to the invention, such a container can be produced in a particularly cost-effective and reliable fashion, because such laser welding enables ensuring nearly perfect sealing between the housing components, which is convenient in maintaining the storage volume according to the design. Furthermore, such laser welding prevents formation of abrasion during production. Costly cleaning measures which, particularly in case of complex geometries, constantly give rise to residual contamination, as well as the quality assurance associated therewith are rendered unnecessary from the start.

During processing, no abraded particles are formed which, especially when using most of the economically interesting types of plastic, would strongly adhere to the plastic components as a result of electrostatic attraction and thus could not be removed completely by cleaning efforts, and therefore, it is made sure that such abrasion cannot reach the sensitive electrohydraulic control of the automatic transmission via the oil flow during operation to cause permanent malfunction therein. Furthermore, it is made sure that such abrasion cannot reach the multiple disc and strap clutches of an automatic transmission via the oil circulation to cause a reduction of the friction values therein.

In tests, it has been found particularly convenient to produce at least one of the plastic housing components from a non-pigmented fiberglass-reinforced polyamide. On the one hand, this provides a particularly favorable precondition for laser welding because such a housing element absorbs only a minor part of the laser light, so that the energy of the laser beam is largely available at the respective welding seam. On the other hand, it is possible in this way to produce oil containers of sufficient dimensional stability and resistance to ATF, mineral oil and residues of gasoline or diesel fuel possibly included in motor oil.

Furthermore, for particularly easy and reliable production of the welding seam, it is highly convenient to produce at least one of the plastic housing components from a fiberglass-reinforced polyamide, particularly one pigmented with carbon black. Pigmenting with carbon black ensures that the laser beam is absorbed to a very high level in the edge areas of such a constructional element, so that rapid and reliable melting of the irradiated areas is ensured by appropriate uptake of energy.

For sufficient durability of the oil container even at elevated operation temperature and yet, good transparency for the laser beam, at least one of the plastic housing components conveniently has a fiberglass level of at least about 10 wt.-%. For dimensional stability even at elevated temperatures, the fiberglass level of any additional plastic housing component is at least about 20 wt.-%, preferably about 30 wt.-%.

For particularly reliable formation of the laser welding seam even in case of complex housing contours, it was found convenient if at least two of the plastic housing components include a different content of reinforcing fibers.

For dimensional stability of the oil container even at elevated oil temperatures, at least one of the plastic housing components advantageously also includes an amount of mineral filler of at least about 15 wt.-%, preferably about 20 wt.-%.

For the field of use in automatic transmissions, it was found particularly convenient if the volume capacity of the oil container is at least about 300 ml, preferably about 330 ml. On the one hand, this provides sufficient relief of the oil volume in the oil pan and, on the other hand, an oil container of such volume still can be integrated without enlarging the transmission housing.

One function as a dynamic oil storing means was found to be particularly convenient, namely, if the oil container is designed in such a way that a complete filling of the oil container with water discharges within a time period of at least about 210 seconds, preferably not more than 240 seconds, particularly from about 220 to 230 seconds, from the oil container in its operating position.

For efficient filling of the oil container, particularly by oil dripping from lubricating points, said at least one inlet opening in operating position of the oil container conveniently is surrounded by a collecting tray.

In tests using existing automatic transmissions, it was found particularly convenient if the collecting tray has a depth of at least about 1.6 mm and is confined by ramps in at least two directions, the upper edges of which being about 4.3 mm above the inlet opening, particularly, if the collecting tray has a width of about 55 mm and/or the collecting tray is at least about 10% wider than said at least one inlet opening.

In order to use the oil container of the invention in an automatic transmission, it was found particularly convenient if the cross-section of the at least one inlet opening is at least 170 mm$^2$ and/or the cross-section of the outlet openings together is not more than 3 mm$^2$. On the whole, tests have revealed that a particularly efficient use is achieved if the cross-section ratio of outlet openings and inlet openings is at least 1:10.

To make sure that the oil container of the invention is filled only after the oil volume increases as a result of thermal expansion, so that filling thereof is required, the inlet opening in a particularly convenient fashion is covered by a bimetallic closure releasing the inlet opening only after a predetermined temperature has been exceeded.

To make sure that the bimetallic closure responds to the oil temperature actually present, the bimetallic closure in a particularly convenient fashion is arranged within the collecting tray.

In one embodiment to be produced in a particularly cost-effective fashion, the oil container is constituted by multiple components using at least three plastic housing components joined to each other by laser welding, at least two of which being non-pigmented or colored so as to be laser light-permeable.

Particularly suited for producing an oil container according to the invention is a process for producing a multi-component oil container using at least two plastic housing components, at least one plastic housing component being formed of a non-pigmented or laser light-permeably colored, fiber-reinforced thermoplastic material, preferably by injection molding, and at least one other plastic housing component being formed of a carbon black-pigmented or laser light-impermeably colored, fiber-reinforced plastic material, preferably by injection molding, said at least two plastic housing components being joined together along their contact areas using pressure, and the gap area between the at least two plastic housing components being irradiated with a laser, so that the edge area of the carbon black-pigmented or laser light-impermeably colored plastic housing component undergoes melting, the molten material being supplied with sufficient energy, so that the area of the non-pigmented or laser light-permeably colored plastic housing component is melted by contact with the molten material, and the melted edge areas join to form a gapless welding seam.

With reference to one embodiment illustrated in the appended drawings, the invention will be explained in more detail below, wherein.

Figure 1:
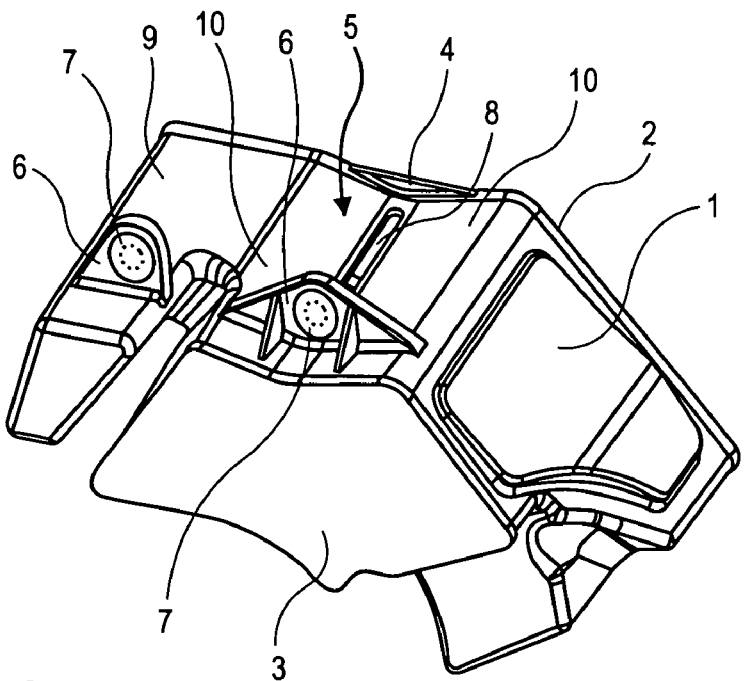
FIG. 1 shows a perspective illustration of an oil container according to the invention in oblique top view.
Figure 2:
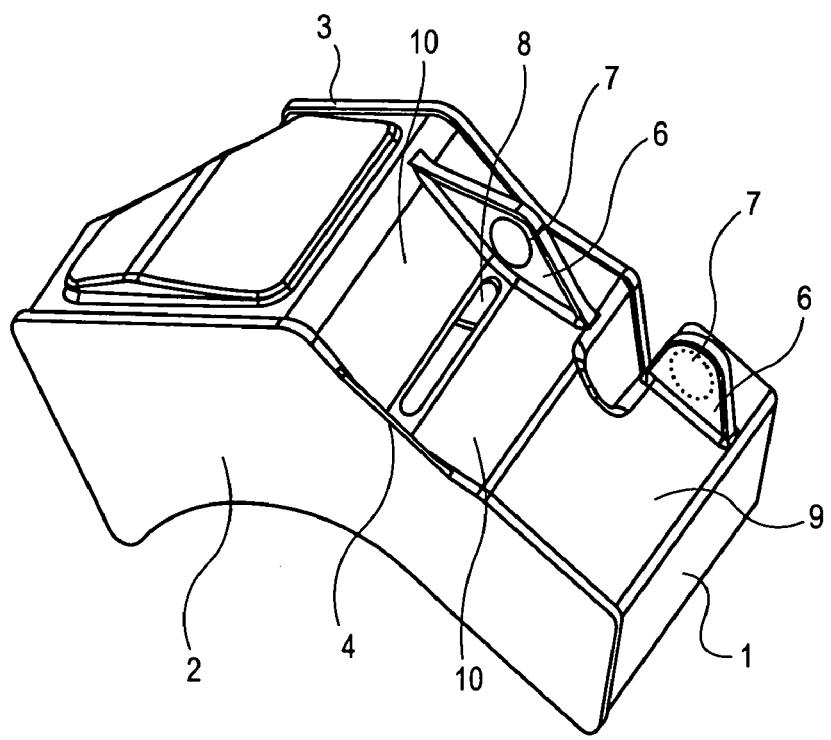
FIG. 2 shows another perspective illustration of the oil container according to the invention, likewise in oblique top view.
Figure 3:
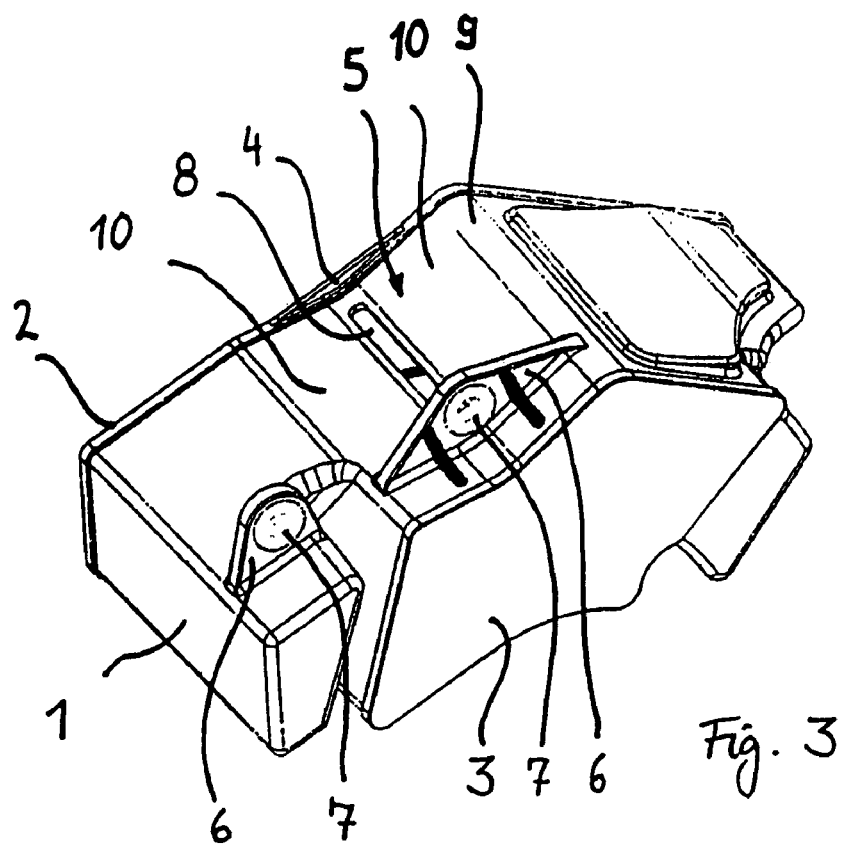
FIG. 3 shows another perspective top view of the oil container of the invention according to FIGS. 1 and 2.
Figure 4:
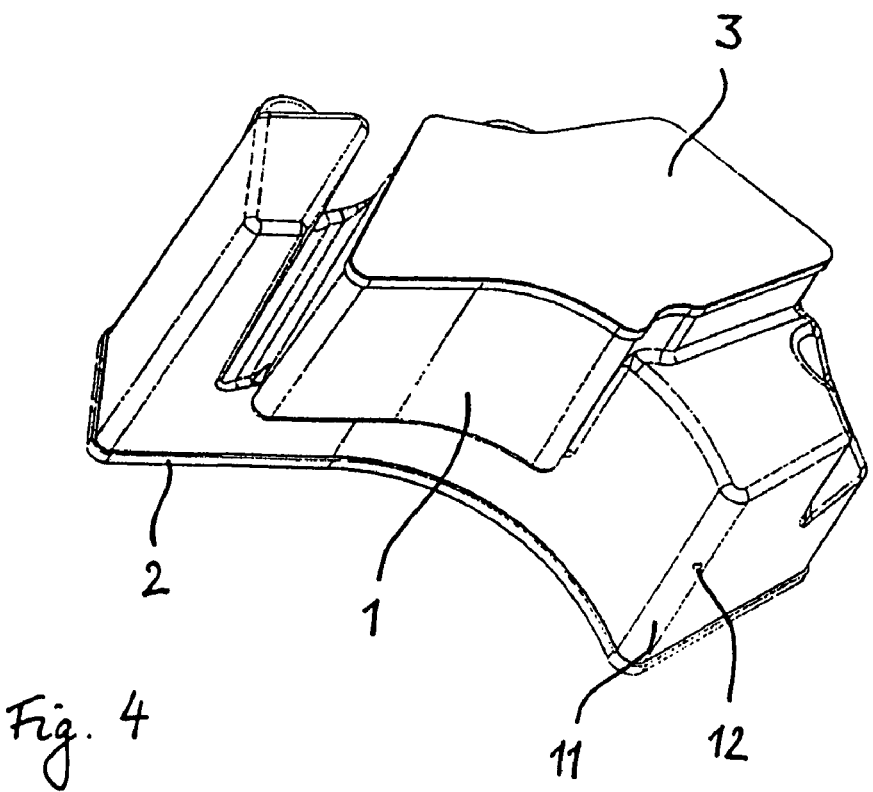
FIG. 4 shows a perspective bottom view of the oil container of the invention according to FIGS. 1 to 3.

In particular, the oil container according to the invention, as illustrated in the figures, is intended for use in an automatic transmission for an automobile, serving to temporarily receive a volume of ATF, the capacity of the oil container being about 330 ml. The oil container is formed of multiple plastic housing components, namely, a central part 1, a large housing cover 2, and a small housing cover 3. In the example described, the housing covers 2 and 3 are formed by injection molding using a non-pigmented thermoplastic material, namely, PA 6-GF, including a fiberglass level of about 10 wt.-%, preferably with an additional mineral filling of 20 wt.-%. The covers 2 and 3 are of essentially flat design, conveniently having a groove not specifically illustrated which extends along the edge and is adapted to receive the housing edges of central part 1.

The large housing cover 2 additionally has a protruding section 4 arranged outside the circumferential groove, terminating a tray 5 formed in the central part 1 of the final oil container.

In a similarly preferred fashion, the central part 1 is formed by injection molding using a fiber-reinforced thermoplastic material, preferably PA 66-GF, including a fiberglass level of 20 wt.-%, preferably 30 wt.-%. Obviously, other suitable reinforcing fibers can also be used in the plastic housing components.

Furthermore, the material forming the central part 1 is additionally provided with a mineral filling of about 20 wt.-%. Conveniently, the central part 1 is pigmented in a laser light-impermeable fashion, e.g. by means of carbon black.

Conveniently, one or two fastening flanges 6 are molded on the central part 1, to which the oil container can be secured e.g. in an automatic transmission. If this is done by means of screws, for example, and if further constructional elements of the transmission are held by these screws, it may be convenient to mold metallic bushings 7 into the fastening flanges 6 so as to avoid unacceptable setting of the screw joint by relaxation of the plastic material.

The above-described oil container is produced by placing the two covers 2 and 3 on the edge of central part 1 and applying some contact pressure so as to ensure reliable contact of covers 2 and 3 with central part 1. Subsequently, the edge area of central part 1 is heated and melted by means of a laser beam through the non-pigmented covers 2 and 3, and the molten material is supplied with energy in an amount that, as a result of contact of the covers with the molten material, the covers likewise undergo melting within the area of the is groove, and the melted edge zones of covers 2 and 3 and central part 1 are joined to form a gapless welding seam.

The welding seam is tight to liquids with an extremely low failure rate, and no abrasion or welding waste is formed during the welding process, which, as a contamination of the oil container, would have to be eliminated by cleansing. In particular, this is highly advantageous in that the oil container is essentially closed and would have to be cleaned from abrasion with great effort and considerable residues if another type of welding process were used.

The welding process according to the invention also permits easy and reliable welding in case of complicated contours of the housing, without necessitating a secondary treatment, the process not being limited to producing a planar welding seam as performed in the present embodiment for other reasons. The oil container thus produced is resistant to mineral oils commonly used and to gasoline or diesel fuel possibly present as residues in motor oil. Owing to the high percentage of fiberglass in the central part 1 and the additional mineral filling, the oil container according to the invention also has high dimensional stability at elevated temperatures.

The exemplary oil container illustrated in the figures is intended to receive part of the oil volume in an automatic transmission during operation so as to prevent the oil level in the oil pan from rising by thermal expansion to such an extent that the transmission gears would submerge in the oil sump, thus giving rise to undesirable foam formation jeopardizing operational safety. To this end, the oil container can be arranged at any position in the transmission, preferably above the oil level of the oil sump, utilizing corners present in the space for installation.

In a particularly convenient fashion, the oil container is situated in the dripping area of lubricating points or in the reflux of the oil cooler preferably switched on thermostatically. To this end, the ATF enters the container through an inlet opening in the form of a slot 8; obviously, it is also possible to provide multiple inlet openings. An area of at least 170 mm$^2$ has proven to be a convenient cross-section for slot 8 so as to ensure sufficiently rapid filling of the container and, on the other hand, prevent that part of the oil volume present in the container would splash or slosh out of the container as a result of motor vehicle motion. To ensure sufficiently rapid filling of the container, a collecting tray 5 is provided around slot 8, which, quite like a funnel, is capable of collecting the oil reaching the top side 9 of the oil container. To this end, the collecting tray 5 is formed by two ramps 10 sloping towards slot 8 and terminated by a fastening flange 6 at the sides thereof and by the protruding section 4 of the large housing cover 2. Suitable dimensions were found to be those wherein the collecting tray 5 conveniently is about 10% wider than the slot 8, e.g. about 55 mm. In case the ramps 10 protrude over the slot 8 by about 4.3 mm, a depth of the tray of about 1.6 mm within the region of the slot was found to be sufficient.

In order to properly comply with the function as a dynamic intermediate storing means, an outlet opening 12 arranged at the bottom side 11 of the oil container has a cross-section which Is not more than one tenth of the cross-section of the inlet opening, conveniently not more than 3 mm$^2$. Depending on the mounting position of the oil container, the outlet opening 12 can also be designed in the form of multiple outlet openings.

It was found particularly convenient in experiments if the dimensions are such that a complete filling of the oil container with water discharges within at least about 210 seconds, preferably not more than 240 seconds, particularly from about 220 to 230 seconds, e.g. about 226 seconds from the oil container in its operating position.

Depending on the field of use of the oil container which normally is intended to receive an excess volume resulting from thermal expansion of the oil, it may also be convenient, depending on the arrangement of the oil container in the transmission, to provide the inlet opening with e.g. a bimetallic closure not illustrated in the drawings, which ensures that the inlet opening is released by respective bending of the bimetallic strip only after a specific oil temperature is reached, so that volume flows into the oil container not before this point. In this respect, such a bimetallic closure conveniently would be arranged within the collecting tray which, particularly for such a use, conveniently is designed to be somewhat deeper, so that the bimetallic closure is constantly wetted by oil dripping down or flowing past, releasing the inlet opening according to the actual oil temperature.

When switching off the engine or transmission having installed the oil container of the invention therein, the oil volume present in the container slowly discharges through the outlet opening 12 and flows back into the oil pan, so that a sufficiently high oil level is present in the oil pan after cooling down of the machinery and a corresponding decrease in volume, so as to ensure sufficiently deep immersion of the suction nozzle of one or more oil pumps and rapid build-up of the required oil pressure when putting the machinery into operation.

The invention claimed is:

1. A container for receiving and discharging an automotive fluid, comprising:
   a housing defining a storage chamber and comprising at least two plastic housing components, the at least two plastic housing components are joined together by laser welding;
   at least one inlet opening in the housing further comprising a closure covering the at least one inlet, and wherein the closure releases the at least one inlet opening when a predetermined temperature of the automotive fluid is exceeded; and
   at least one outlet opening on the housing, wherein a cross-section of said at least one inlet opening is greater than a cross-section of said at least one outlet opening, and wherein, during use of the container, there is a net rate of flow into the storage chamber.

2. The container of claim 1, wherein one of the at least two plastic housing components is made of a non-pigmented fiberglass-reinforced polyamide.

3. The container according to claim 1, wherein one of the at least two plastic housing components is made of a carbon black-pigmented fiberglass-reinforced polyamide.

4. The container according to claim 1, wherein one of the at least two plastic housing components has a fiberglass amount of at least about 10% wt.

5. The container according to claim 1, wherein one of the at least two plastic housing components has a fiberglass amount of the at least about 20% wt.

6. The container according to claim 1, wherein one of the at least two plastic housing components has a fiberglass amount of at least about 30% wt.

7. The container according to claim 1, wherein a first one of the at least two plastic housing components comprises a greater content of reinforcing fibers than a second one of the at least two plastic housing components.

8. The container according to claim 1, wherein one of the at least two plastic housing components comprises an amount of mineral filler that is at least about 15% wt.

9. The container according to claim 8, wherein the amount of mineral filler is at least about 20% wt.

10. The container according to claim 1, wherein a volume capacity of the container is at least about 300 ml.

11. The container according to claim 1, wherein a volume capacity of the container is at least about 330 ml.

12. The container according to claim 1, wherein a complete filling of the container with water discharges, within a time period of at least about 210 seconds, but not greater than 240 seconds, from the container, when said container is in an operating position.

13. The container according to claim 12, wherein the time period ranges from about 220 seconds to about 230 seconds.

14. The container according to claim 1, wherein said at least one inlet opening is surrounded by a collecting tray.

15. The container according to claim 14, further comprising ramps having upper edges that are about 4.3 mm above the at least one inlet opening, and wherein the collecting tray has a depth of at least about 1.6 mm and is confined by said ramps in at least two directions.

16. The container according to claim 14, wherein the collecting tray has a width of at least about 55 mm.

17. The container according to claim 1, wherein the cross-section of said at least one inlet opening is at least about 10% wider than the cross-section of said at least one outlet opening.

18. The container according to claim 1, wherein the cross-section of the at least one inlet opening is at least 170 mmZ.

19. The container according to claim 1, wherein said at least one outlet opening is a plurality of outlet openings and a cross-section of the plurality outlet openings summed together is not more than 3 mm2.

20. The container according to claim 1, wherein a cross-section ratio of said at least one outlet opening and at least one inlet opening is at least 1:10.

21. The container according to claim 1, wherein the closure is a bimetallic closure.

22. The container according to claim 21, wherein the bimetallic closure is arranged with the collecting tray.

23. The container according to claim 1, wherein the housing comprises at least three plastic housing components joined to each other by laser welding, and wherein at least two of the at least three plastic housing components are at least one of non-pigmented and colored so as to be laser light-permeable.

24. A container for receiving and discharging an automotive fluid, comprising: means for receiving an automotive fluid;
   means for storing the automotive fluid received from the receiving means;
   means for discharging the automotive fluid stored in the storing means, wherein a net rate of flow into the receiving means is greater than a net rate of flow from the discharging means; and
   means for covering the receiving means, wherein the means for covering releases the receiving means when a predetermined temperature of the automotive fluid is exceeded.

* * * * *